United States Patent
Graham

(10) Patent No.: US 10,726,961 B2
(45) Date of Patent: Jul. 28, 2020

(54) PWR DECAY HEAT REMOVAL SYSTEM IN WHICH STEAM FROM THE PRESSURIZER DRIVES A TURBINE WHICH DRIVES A PUMP TO INJECT WATER INTO THE REACTOR PRESSURE VESSEL

(71) Applicant: BWXT mPower, Inc., Charlotte, NC (US)

(72) Inventor: Thomas G. Graham, Lynchburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 334 days.

(21) Appl. No.: 15/689,724

(22) Filed: Aug. 29, 2017

(65) Prior Publication Data

US 2018/0053571 A1    Feb. 22, 2018

Related U.S. Application Data

(62) Division of application No. 14/064,291, filed on Oct. 28, 2013, now Pat. No. 9,779,840.

(51) Int. Cl.
*G21C 15/18* (2006.01)
*G21C 1/09* (2006.01)
(Continued)

(52) U.S. Cl.
CPC .............. *G21C 15/182* (2013.01); *G21C 1/09* (2013.01); *G21D 1/00* (2013.01); *G21D 3/06* (2013.01);
(Continued)

(58) Field of Classification Search
CPC .... G21C 15/182; G21C 15/185; G21C 9/012; G21C 1/09; G21D 1/00; G21D 3/06
(Continued)

(56) References Cited

U.S. PATENT DOCUMENTS 3,431,168 A    3/1969  Kjemtrup
4,278,500 A    7/1981  Ailloud et al.
(Continued)

FOREIGN PATENT DOCUMENTS

EP    2096644 A2    9/2009
JP    2001349975 A    12/2001
KR    20130131757 A    12/2013

OTHER PUBLICATIONS

Aybar, "Passive core injection system with steam driven jet pump for next generation nuclear reactors", Annals of Nuclear Energy 26 (1999) 769-781.

*Primary Examiner* — Jack W Keith
*Assistant Examiner* — Daniel Wasil
(74) *Attorney, Agent, or Firm* — Nelson Mullins Riley & Scarborough LLP

(57) ABSTRACT

In conjunction with a pressurized water reactor (PWR) and a pressurizer configured to control pressure in the reactor pressure vessel, a decay heat removal system comprises a pressurized passive condenser, a turbine-driven pump connected to suction water from at least one water source into the reactor pressure vessel; and steam piping configured to deliver steam from the pressurizer to the turbine to operate the pump and to discharge the delivered steam into the pressurized passive condenser. The pump and turbine may be mounted on a common shaft via which the turbine drives the pump. The at least one water source may include a refueling water storage tank (RWST) and/or the pressurized passive condenser. A pressurizer power operated relief valve may control discharge of a portion of the delivered steam bypassing the turbine into the pressurized passive condenser to control pressure in the pressurizer.

10 Claims, 2 Drawing Sheets

(51) Int. Cl.
  *G21D 1/00* (2006.01)
  *G21D 3/06* (2006.01)
  *G21C 9/012* (2006.01)

(52) U.S. Cl.
  CPC .......... *G21C 9/012* (2013.01); *G21C 15/185* (2019.01); *Y02E 30/32* (2013.01)

(58) Field of Classification Search
  USPC ........................................ 376/282, 283, 299
  See application file for complete search history.

(56) References Cited

U.S. PATENT DOCUMENTS

| | | | |
|---|---|---|---|
| 4,473,528 A | 9/1984 | Kleimola | |
| 4,576,782 A * | 3/1986 | Loose | G21C 15/18 376/282 |
| 4,753,771 A | 6/1988 | Conway et al. | |
| 4,897,240 A | 1/1990 | Sako | |
| 4,986,956 A | 1/1991 | Garabedian | |
| 5,000,907 A | 3/1991 | Chevereau et al. | |
| 5,011,652 A | 4/1991 | Tominaga et al. | |
| 5,045,274 A | 9/1991 | Donaldson | |
| 5,049,353 A | 9/1991 | Conway et al. | |
| 5,075,070 A | 12/1991 | Costes | |
| 5,087,408 A | 2/1992 | Tominaga et al. | |
| 5,102,616 A | 4/1992 | Gardner et al. | |
| 5,106,571 A | 4/1992 | Wade et al. | |
| 5,120,494 A | 6/1992 | Nazarene et al. | |
| 5,169,595 A | 12/1992 | Cooke | |
| 5,202,083 A | 4/1993 | Spinks et al. | |
| 5,268,943 A | 12/1993 | Corletti et al. | |
| 5,276,720 A | 1/1994 | Oosterkamp et al. | |
| 5,282,230 A | 1/1994 | Billig et al. | |
| 5,301,216 A | 4/1994 | Klapdor et al. | |
| 5,349,617 A | 9/1994 | Gautier | |
| 5,517,538 A | 5/1996 | Seidelberger et al. | |
| 5,661,770 A | 8/1997 | Spinks | |
| 5,694,442 A | 12/1997 | Cinotti et al. | |
| 5,887,043 A | 3/1999 | Spinks | |
| 6,795,518 B1 | 9/2004 | Conway et al. | |
| 7,154,982 B2 | 12/2006 | Gautier et al. | |
| 8,170,173 B2 | 5/2012 | Reyes, Jr. et al. | |
| 9,460,818 B2 | 10/2016 | Bergman | |
| 2009/0129530 A1 | 5/2009 | Reyes, Jr. et al. | |
| 2009/0129531 A1 | 5/2009 | Reyes et al. | |
| 2010/0278294 A1 | 11/2010 | Kwon et al. | |
| 2012/0177168 A1 | 7/2012 | Reyes, Jr. et al. | |
| 2012/0207260 A1 | 8/2012 | Houghton et al. | |
| 2012/0294408 A1 | 11/2012 | Reyes, Jr. et al. | |
| 2013/0301782 A1 | 11/2013 | Malloy | |
| 2013/0336440 A1 | 12/2013 | Memmott et al. | |
| 2013/0336441 A1 | 12/2013 | Cronje et al. | |
| 2014/0016734 A1 | 1/2014 | Moon et al. | |
| 2014/0050292 A1 | 2/2014 | Kim et al. | |
| 2014/0270044 A1 | 9/2014 | Watson et al. | |

\* cited by examiner

PWR DECAY HEAT REMOVAL SYSTEM IN WHICH STEAM FROM THE PRESSURIZER DRIVES A TURBINE WHICH DRIVES A PUMP TO INJECT WATER INTO THE REACTOR PRESSURE VESSEL

CLAIM OF PRIORITY

This application is a divisional of U.S. patent application Ser. No. 14/064,291 filed Oct. 28, 2013, the entire disclosure of which is incorporated by reference herein.

This invention was made with Government support under Contract No. DE-NE0000583 awarded by the Department of Energy. The Government has certain rights in this invention.

BACKGROUND

The following relates to the nuclear power generation arts, nuclear reactor safety arts, nuclear reactor control arts, and related arts.

During normal operation of a nuclear reactor, the nuclear chain reaction (and hence the thermal output of the reactor) is controlled to maintain temperature and pressure of the coolant water in the reactor pressure vessel in a normal range. This control is achieved using mechanisms such as a control rods system, control of steam generator feed water flow, adjusting a concentration of soluble boron neutron poison in the coolant water, or so forth.

The steam generator acts as the heat sink for the nuclear reactor. If a pipe rupture interrupts feed water flow into the steam generator or steam flow out of the steam generator, a feed water flow is lost, or so forth, this heat sinking is compromised. In such a loss of heat sinking event, pressure and temperature of the coolant in the reactor pressure vessel rise, and this must be counteracted to maintain the nuclear reactor in a safe condition.

To this end, the control rods are inserted (scrammed) to extinguish the nuclear chain reaction. However, the reactor core continues to output residual heat due to radioactive intermediate products of the nuclear chain reaction. Passive cooling systems reliant on a closed-loop evaporation/condensation cycle may be employed to remove this residual heat.

If the passive cooling systems are unable to keep up with the residual heat output from the shut-down reactor core, then the temperature and pressure of the coolant inside the pressure vessel will continue to rise. In this circumstance, an emergency core cooling system (ECCS) is brought online to depressurize the pressure vessel by venting (into a suitable condenser, or into the surrounding radiological containment structure, or other suitable structure) while maintaining sufficient water flow into the reactor pressure vessel to avoid exposure of the nuclear reactor core.

BRIEF SUMMARY

In one disclosed aspect, an apparatus comprises: a pressurized water reactor (PWR) including a nuclear reactor core comprising fissile material disposed in a reactor pressure vessel also containing primary coolant water; a pressurizer integral with or operatively connected with the reactor pressure vessel and configured to control pressure in the reactor pressure vessel; and a decay heat removal system including a pressurized passive condenser and a pump driven by a turbine in which steam from the pressurizer drives the turbine and exhausts into the pressurized passive condenser and the pump is connected to suction water from the pressurized passive condenser into the reactor pressure vessel. A pressurizer power operated relief valve may be configured to control discharge of steam bypassing the turbine into the pressurized passive condenser to control pressure in the pressurizer. A pressurizer block valve may be configured to activate the decay heat removal system by opening to admit steam from the pressurizer to the turbine. The pump and the turbine may be mounted on a common shaft so that the shaft provides direct mechanical coupling via which the turbine drives the pump.

In another disclosed aspect, a method operates in conjunction with a pressurized water reactor (PWR) including a nuclear reactor core comprising fissile material disposed in a reactor pressure vessel also containing primary coolant water, a pressurizer integral with or operatively connected with the reactor pressure vessel and configured to control pressure in the reactor pressure vessel, and a refueling water storage tank (RWST). The method comprises responding to a loss of heat sinking of the PWR by operations including driving a turbine using steam piped from the pressurizer, and driving a pump using the turbine to suction water from the RWST into the reactor pressure vessel. The driving of the pump may comprise providing a common shaft mechanically connecting the turbine and the pump whereby the driven turbine rotates the common shaft to drive the pump. The method may further include the operations of discharging steam piped from the pressurizer into a pressurized passive condenser, and connecting the suction side of the pump to both the RWST and the pressurized passive condenser wherein the driving of the pump also suctions water from the pressurized passive condenser into the reactor pressure vessel.

In another disclosed aspect, a decay heat removal system operates in conjunction with a pressurized water reactor (PWR) including a nuclear reactor core comprising fissile material disposed in a reactor pressure vessel also containing primary coolant water and a pressurizer integral with or operatively connected with the reactor pressure vessel and configured to control pressure in the reactor pressure vessel. The decay heat removal system comprises: a pressurized passive condenser; a turbine; a pump driven by the turbine and connected to suction water from at least one water source into the reactor pressure vessel; and steam piping configured to deliver steam from the pressurizer to the turbine to operate the pump and to discharge the delivered steam into the pressurized passive condenser. The pump and the turbine may be mounted on a common shaft so that the shaft provides direct mechanical coupling via which the turbine drives the pump. The at least one water source may include a refueling water storage tank (RWST) disposed with the PWR in a radiological containment structure and/or the pressurized passive condenser. The steam piping may include a pressurizer power operated relief valve configured to control discharge of a portion of the delivered steam bypassing the turbine into the pressurized passive condenser to control pressure in the pressurizer.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

Disclosed herein are embodiments of an alternative safety function (ASF) system that provides a safety response that is more aggressive than reliance upon passive evaporation/condensation systems but which avoids the loss of coolant entailed in invoking the emergency core cooling system (ECCS). The disclosed ASF system provides an alternative mechanism to control the reactor coolant system (RCS) temperature and inventory thereby avoiding (at least in some postulated events) actuation of the ECCS with its concomitant reactor pressure vessel depressurization in the event of a loss of heat sinking due to an event such as a steam generator tube rupture (SGTR), a main steam line break, a feed water line break, or a loss of feed water. The disclosed ASF system also provides an alternative mechanism for reactor shutdown in the event that the primary reactor shutdown mechanism is ineffective.

Figure 1:
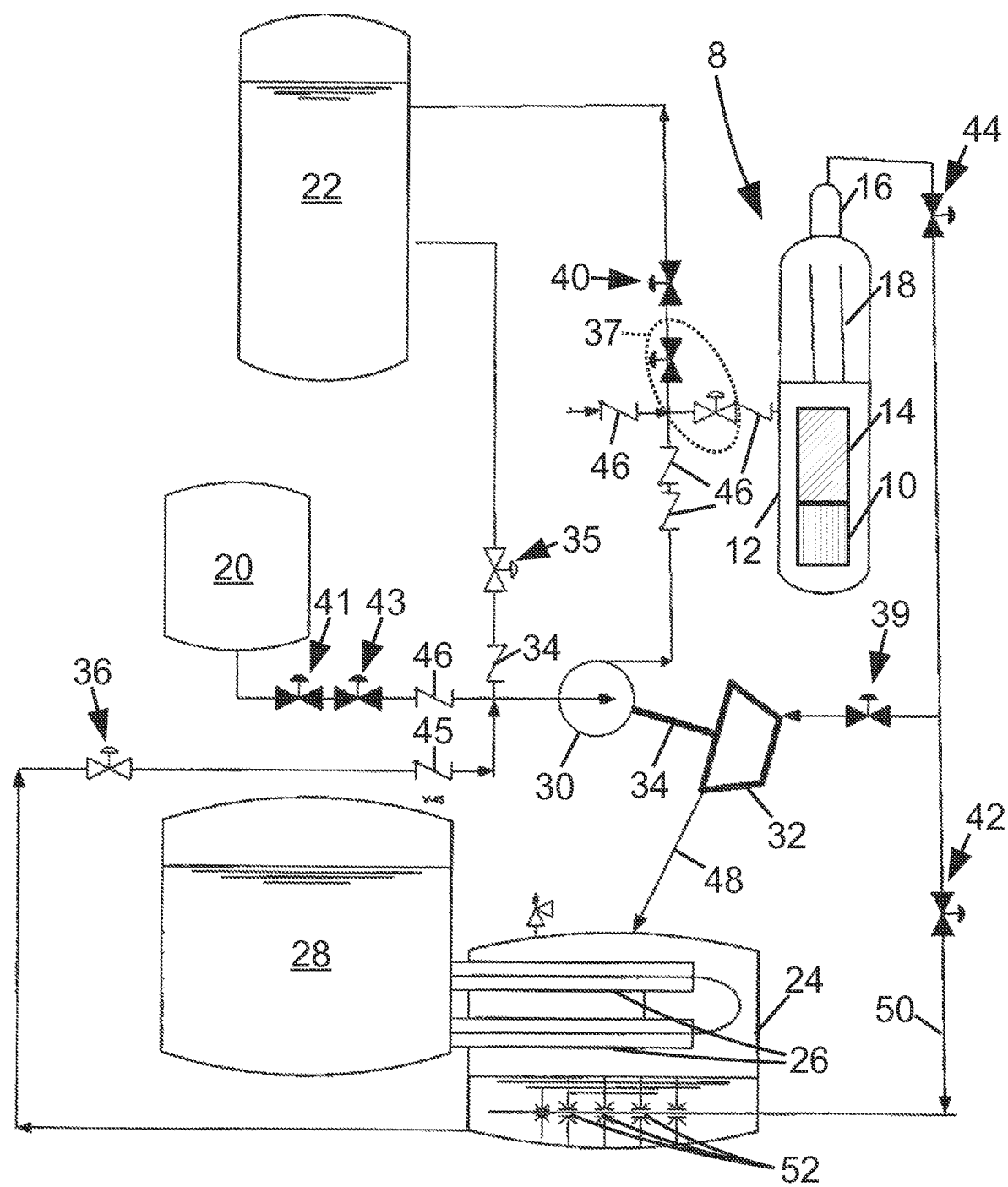
FIG. 1 diagrammatically shows a nuclear island including an alternative safety function (ASF) system as disclosed herein.

With reference to FIG. 1, a nuclear reactor island including a nuclear reactor 8 is diagrammatically shown. FIG. 1 diagrammatically represents the nuclear island by way of symbolic icons representing components of the island.

The nuclear reactor 8 includes a nuclear reactor core 10 comprising fissile material disposed in a reactor pressure vessel (RPV) 12 containing (primary) coolant, typically in the form of purified water ($H_2O$), comprising the reactor coolant system (RCS). Optionally, the coolant may include additives such as a soluble boron poison to assist in reactivity control. The nuclear reactor core 10 is typically constructed as $UO_2$ pellets enriched in fissile $^{235}U$ and loaded into fuel rods assembled into fuel assemblies which are in turn arranged to form the reactor core. The fuel rods may have various compositional arrangements, e.g. axial zones of different enrichment levels, inclusion of neutron poison pellets or compositional components, or so forth. Thermal power output due to the nuclear chain reaction in the reactor core 10 is regulated by operation of a control rods system 14 comprising control rods of a neutron-absorbing material controllably inserted into/withdrawn from the nuclear reactor core 10 by suitable control rod drive mechanisms (CRDM's). The diagrammatically indicated control rods system 14 is an internal system whose CRDMs are located inside the reactor pressure vessel 12; alternatively, external CRDMs may be employed along with suitable mechanical feedthroughs and/or pressure boundary extensions to couple into the RPV 12. The illustrative nuclear reactor 8 is of the pressurized water reactor (PWR) variety and includes an integral pressurizer 16 for controlling reactor coolant pressure inside the reactor pressure vessel 12; alternatively, an external pressurizer connected with the pressure vessel by suitable piping is contemplated. The illustrative PWR 8 is an integral PWR in which an internal steam generator 18 is disposed inside the reactor pressure vessel 12; alternatively, an external steam generator may be connected with the RPV 12 by suitable piping. The diagrammatically indicated internal steam generator 18 is a once-through steam generator (OTSG), but other steam generator designs, such as a helical steam generator, are also contemplated. Moreover, two or more steam generator units may be provided for redundancy. In the steam generator 18, (secondary) coolant water flow is placed into thermal communication with the primary coolant water to heat sink the PWR 8.

The illustrative nuclear island also includes components of an emergency core cooling system (ECCS), including a pressurized boron storage tank 20 containing borated water (that is, water containing a high concentration of soluble boron poison) for injection into the reactor pressure vessel 12 as part of the ECCS response, a refueling water storage tank (RWST) 22 which provides a water reservoir for routine reactor refueling operations as well as providing a water supply for long-term decay heat removal after depressurization of the reactor pressure vessel 12.

During normal operation (configuration not shown in FIG. 1), secondary coolant is injected into the steam generator 18 via a feed water inlet of the RPV 12, and steam is output from a steam outlet of the RPV 12. The secondary coolant flowing inside the steam generator 18 is heated by heat transfer from the primary coolant inside the RPV 12 to convert the feed water to steam. Although the secondary coolant water is in thermal communication with the primary coolant water, it is in fluid isolation from the primary coolant water. For example, in a tube-and-shell steam generator design, primary coolant flows in a shell surrounding tubes carrying the secondary coolant (or vice versa). The steam output from the steam outlet of the RPV 12 is suitably used to perform useful work, for example driving the turbine (not shown) of an electrical generator in the case of a nuclear power plant. The nuclear chain reaction in the nuclear reactor core 10 generates the thermal output that heats the primary coolant water, and the nuclear chain reaction is controlled by operation of the control rods system 14 and/or other control mechanisms such adjusting the concentration of soluble boron in the primary coolant water, adjusting the feed water flow rate or temperature, or so forth.

In a loss of heat sinking event, closed-loop circulation of secondary coolant through the steam generator 18 is interrupted. In this event, an alternative safety function (ASF) system is activated. The ASF system includes a pressurized passive condenser (PPCND) 24 with condenser coils 26 and a passive cooling water tank 28. (Other thermal sinks are contemplated in place of the passive cooling water tank 28, such as a PPCND employing an air-cooled radiator with battery-operated fans). The ASF system further includes a turbine-driven pump 30 that is driven by a turbine 32. In the illustrative embodiment, the pump 30 and the turbine 32 are mounted on a common shaft 34 so that the shaft 34 provides direct mechanical coupling via which the turbine 32 drives the pump 30. In other contemplated embodiments (not illustrated), the turbine includes an electrical generator (i.e., a turbine-generator on a common shaft) and electricity from the generator of the turbine-generator system drives the pump. However, the illustrative embodiment including the pump 30 and turbine 32 on a common shaft 34 advantageously reduces the number of parts (eliminating, e.g. the generator and electrical connections between the generator and pump) and consequently is expected to be more robust and less prone to malfunction. The ASF system also includes associated connecting piping and valves. The simplified diagrammatic representation of FIG. 1 shows: a valve 35 on the drain of the RWST 22, a pressurized passive condenser (PPCND) level control valve 36, recirculation flow block valves 37, a steam turbine control valve 39, a back-pressure control valve 40 that controls charging flow to the reactor coolant system (RCS), a pressurizer power operated relief valve (pressurizer PORV) 42 providing pressurizer pressure control, boron storage tank valves 41, 43 controlling release of borated water from the boron storage tank 20, a pressurizer steam supply block valve 44, and check valves 34, 45, 46.

The ASF system provides passive recirculation in the event of a loss of heatsinking event. In contrast to an evaporation/condensation recirculation system, the ASF system employs the pump 30 to drive closed-loop circulation of water, with the motive force for the pump 30 being provided by pressure in the pressurizer 16 via the turbine 32 and common shaft 34. The pressurizer 16 is at elevated pressure during a loss of heatsinking event due to the residual decay heat generated by the nuclear reactor core heating the primary coolant. A portion of this pressure is vented as steam to the turbine 32 which drives the pump 30, with the turbine exhausting to the pressurized passive condenser (PPCND) 24 via a turbine exhaust line 48.

Figure 2:
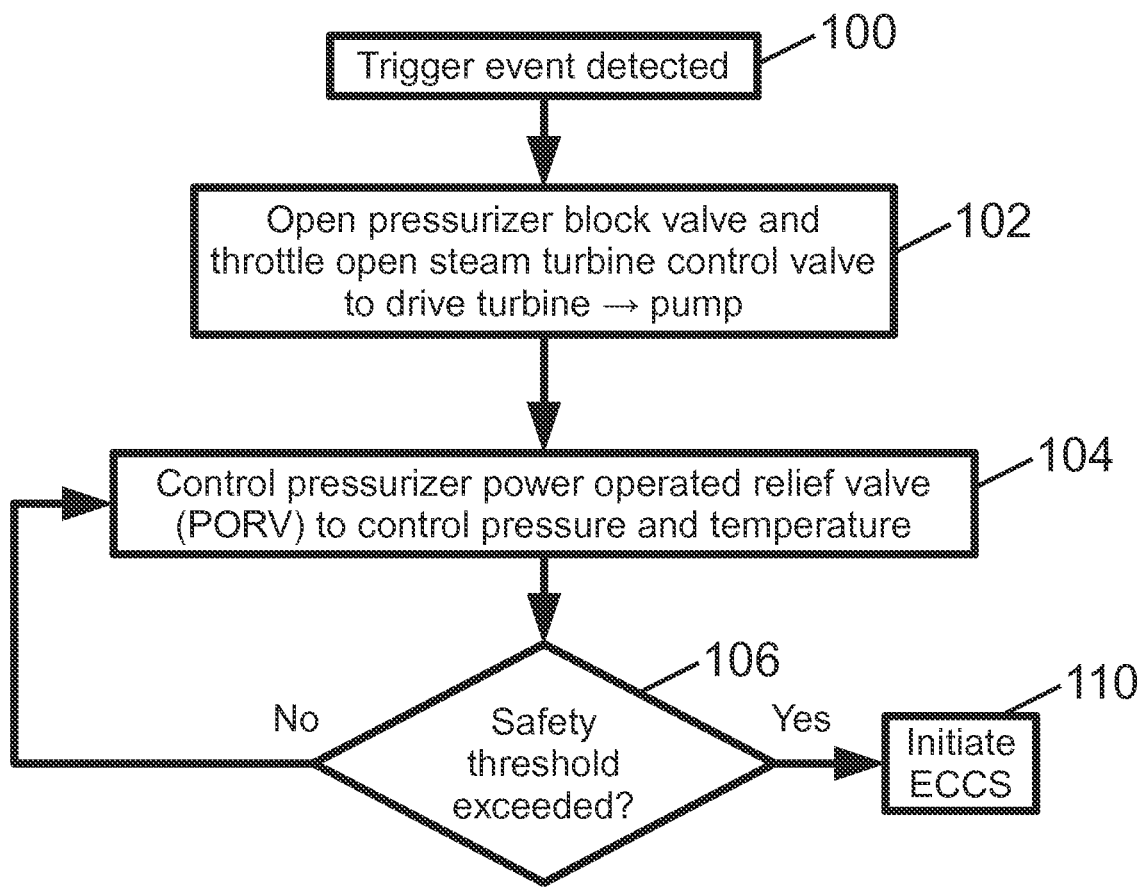
FIG. 2 diagrammatically shows a flowchart of operations in a typical operation of the ASF system of FIG. 1.

With continuing reference to FIG. 1 and with further reference to FIG. 2, during a loss of heatsinking event the nuclear island assumes the configuration shown in FIG. 1. In an operation 100, a trigger event is detected that causes activation of the ASF system. The trigger event may, for example, be detection of a steam generator tube rupture (SGTR), detection of a main steam line break, detection of a feed water line break, or detection of a loss of feed water. Such detection is preferably automatic, e.g. based on steam pressure read by a pressure sensor dropping below a trigger threshold or feed water flow read by a flow meter dropping below a trigger threshold. Additionally or alternatively, the trigger event may be a manual activation of the ASF system. Upon activation, in an operation 102 the pressurizer block valve 44 opens and the steam turbine control valve 39 throttles open admitting steam to the turbine 32 which provides motive force to the pump 30. The turbine 32 exhausts to the pressurized passive condenser 24 via the turbine exhaust line 48. In an operation 104, pressurizer pressure and hence RCS temperature (RCS is at saturation) is controlled by the pressurizer PORV 42 with the discharge sparged in the pressurized passive condenser 24 via a discharge line 50 and spargers 52. Once the pressurized passive condenser 24 exceeds the static head of the RWST 22 it is able to provide a suction source to the pump 30 (assuming sufficient level in the pressurized passive condenser 24). In one contemplated embodiment, the pressurized passive condenser 24 operates at approximately 100 psia and 325° F. (160° C.), although other condenser operating temperature/pressure conditions are also contemplated. The elevated temperature in the pressurized passive condenser 24 reduces the thermal stress associated with the steam discharge into the pressurized passive condenser 24 via the discharge line 50, which in one contemplated typical PWR is at a steam temperature of about 600° F. (315° C.). The steam is sparged into the liquid zone of the pressurized passive condenser 24 via the spargers 52 to further reduce thermal stresses on the pressurized passive condenser 24.

The ASF system is a passive safety system, and requires no external power other than the pressure in the pressurizer 16 (which is inherently present in a loss of heatsinking event) and power for valves/controller circuits which is suitably supplied by a battery, alternator, nitrogen bottles providing pneumatic valve motive force, or so forth. Thus, the disclosed ASF system supports long-term operation without outside support. The pump 30 provides sufficient pressure to provide flow to the RCS to support decay heat removal and postulated LOCA inventory losses. The injection flow is controlled by the back-pressure control valve 40 to maintain level in the pressurizer. The condenser level control valve 36 provides closed loop supply of working fluid to facilitate long-term cooling capability.

In the illustrative embodiment, the suction side of the pump 30 is connected with both the pressurized passive condenser 24 and the RWST 22 so that the pump 30 can suction water into the RPV 12 from one or both sources 22, 24. The two sources 22, 24 provide synergistic benefits: the pressurized passive condenser 24 receives steam from the RPV 12 via the turbine exhaust line 48 and the discharge line 50, so as to form a closed-loop recirculation path that can in principle operate indefinitely. On the other hand, the RWST 22 provides a large reservoir of water located inside the radiological containment structure with the PWR 8 that can be tapped to maintain decay heat removal in the event of a leak associated with the pressurized passive condenser 24. While the illustrative embodiment leverages both synergistic benefits by connecting the suction side of the pump 30 to both the RWST 22 and the pressurized passive condenser 24, it is contemplated to alternatively connect the suction side of the pump 30 to only one of these water sources (i.e. to only the RWST 22 but not the pressurized passive condenser 24; or, to only the pressurized passive condenser 24 but not the RWST 22).

Additionally, in the illustrative embodiment of FIG. 1, the boron storage tank 20 is injected into the RPV 12 via the pump 30. In this embodiment, the pump 30 can take suction from the boron storage tank 20 when the valves 41, 43 are both open (for alternative reactor shutdown) and provides discharge pressure sufficient to inject into the RCS. Alternatively, the boron storage tank may connect into the RPV 12 via pressure vessel feed-throughs separate from the ASF system.

With continuing reference to FIGS. 1 and 2, the ASF system provides long-term cooling capability in a loss of heatsinking event. However, if in an operation 106 a safety threshold is exceeded (e.g., the pressure in the pressurizer 16 rises above a threshold pressure in spite of exhausting via the discharge line 50) then in an operation 110 the emergency core cooling system (ECCS) is suitably activated (for example, remediating the elevated pressure by venting into the radiological containment structure).

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A decay heat removal system operating in conjunction with a pressurized water reactor (PWR) including a nuclear reactor core comprising fissile material disposed in a reactor pressure vessel also containing primary coolant water and a pressurizer integral with or operatively connected with the reactor pressure vessel and configured to control pressure in the reactor pressure vessel, the decay heat removal system comprising:
    a pressurized passive condenser;
    a turbine;
    a pump driven by the turbine and connected to suction water from at least one water source into the reactor pressure vessel; and
    steam piping configured to deliver steam from the pressurizer to the turbine to operate the pump and to discharge the delivered steam into the pressurized passive condenser.

2. The decay heat removal system of claim 1 further comprising:
a common shaft, the pump and the turbine being mounted on the common shaft so that the shaft provides direct mechanical coupling via which the turbine drives the pump.

3. The decay heat removal system of claim 1 wherein the at least one water source includes a refueling water storage tank (RWST) disposed with the PWR in a radiological containment structure.

4. The decay heat removal system of claim 1 wherein the at least one water source includes the pressurized passive condenser.

5. The decay heat removal system of claim 1 wherein the at least one water source includes (1) a refueling water storage tank (RWST) disposed with the PWR in a radiological containment structure and (2) the pressurized passive condenser.

6. The decay heat removal system of claim 1 wherein the steam piping includes a pressurizer power operated relief valve configured to control discharge of a portion of the delivered steam bypassing the turbine into the pressurized passive condenser to control pressure in the pressurizer.

7. The decay heat removal system of claim 1 wherein the steam piping includes:
a pressurizer block valve configured to activate the decay heat removal system by opening to admit steam from the pressurizer to the turbine;
a pressurizer power operated relief valve downstream of the pressurizer block valve and configured to control discharge of steam into the pressurized passive condenser to control pressure in the pressurizer; and
a steam turbine control valve downstream of the pressurizer block valve and configured to throttle steam into the turbine.

8. The decay heat removal system of claim 1, wherein the pressurizer comprises an integral pressurizer.

9. The decay heat removal system of claim 1 further comprising:
a steam generator configured to heat sink the PWR by flow of secondary coolant water in thermal communication with the primary coolant water; and
a pressurizer block valve configured to activate the decay heat removal system in response to a loss of heat sinking by the steam generator by opening to admit steam from the pressurizer to the turbine.

10. The decay heat removal system of claim 9 wherein the steam generator comprises an internal steam generator disposed inside the reactor pressure vessel.

* * * * *

UNITED STATES PATENT AND TRADEMARK OFFICE
CERTIFICATE OF CORRECTION

| | |
|---|---|
| PATENT NO. | : 10,726,961 B2 |
| APPLICATION NO. | : 15/689724 |
| DATED | : July 28, 2020 |
| INVENTOR(S) | : Thomas G. Graham |

It is certified that error appears in the above-identified patent and that said Letters Patent is hereby corrected as shown below:

In the Specification

In Column 1, Line 12, please insert the paragraph heading --STATEMENT REGARDING FEDERALLY SPONSORED RESEARCH OR DEVELOPMENT--.

Signed and Sealed this
Fifteenth Day of December, 2020

Andrei Iancu
*Director of the United States Patent and Trademark Office*